United States Patent [19]
Hillier et al.

[11] Patent Number: 6,055,636
[45] Date of Patent: Apr. 25, 2000

[54] METHOD AND APPARATUS FOR CENTRALIZING PROCESSING OF KEY AND CERTIFICATE LIFE CYCLE MANAGEMENT

[75] Inventors: Stephen William Hillier, Ottawa; Ramon Jonathan Lee Dilkie, Stittsville; Gerrard Eric Rosenquist, Kanata, all of Canada

[73] Assignee: Entrust Technologies, Limited, Ottawa, Canada

[21] Appl. No.: 09/013,875

[22] Filed: Jan. 27, 1998

[51] Int. Cl.[7] ................................................. G06F 12/14
[52] U.S. Cl. ........................................................ 713/200
[58] Field of Search .................................... 713/200, 201

[56] References Cited

U.S. PATENT DOCUMENTS

| | | | |
|---|---|---|---|
| 5,633,933 | 5/1997 | Aziz | 380/30 |
| 5,825,300 | 10/1998 | Bathrick et al. | 340/825.33 |
| 5,864,667 | 1/1999 | Barkan | 395/187.01 |
| 5,872,849 | 2/1999 | Sudia | 380/49 |
| 5,922,074 | 7/1999 | Richard et al. | 713/200 |
| 5,935,246 | 8/1999 | Benson | 713/200 |

OTHER PUBLICATIONS

"Handbook of Applied Cryptography", Alfred Menezes, Paul Van Oorschot, and Scott Vanstone CRC Press Inc. pp. 577–581/ 1997.

*Primary Examiner*—Ayaz R. Sheikh
*Assistant Examiner*—Jigar Pancholi
*Attorney, Agent, or Firm*—Markison & Reckamp, P.C.

[57] ABSTRACT

A method and apparatus for centralizing the processing of key and certificate life-cycle management is accomplished when security activation of a communication device has been detected. Security activation may occur at log-on of the secure communication device (e.g., a personal computer equipped with a security application, or applications), at activation of a security application, or at re-authentication of a security application. Once the security activation has been detected, the secured communication device accesses a depository of security information to retrieve relevant security information. The secured communication device then interprets the relevant security information to determine when local security parameters are to be changed. When local security parameters (e.g., encryption key pair, a corresponding encryption public key certificate, a signing key pair, and/or a corresponding verification public key certificate) are to be changed, the local security parameters are updated. Having done this, the secured communication device is then receptive to receiving access requests from a plurality of software applications. The access requests are each requesting that data created by a corresponding one of the plurality of software application be secured via the security application. In response to the request, the data is secured based on either the updated local security parameters or the existing local security parameters.

26 Claims, 3 Drawing Sheets

METHOD AND APPARATUS FOR CENTRALIZING PROCESSING OF KEY AND CERTIFICATE LIFE CYCLE MANAGEMENT

TECHNICAL FIELD OF THE INVENTION

The present invention relates generally to secure communications and more particularly to centralizing management of keys and certificate life cycles.

BACKGROUND OF THE INVENTION

As is known, to securely transmit data from one party to another in a secured communications system, the data is encrypted using an encryption key and an encryption algorithm. Such an encryption algorithm may be a symmetric key algorithm such as the data encryption standard ("DES") while the encryption key is a corresponding symmetric key. A secure transmission begins when a sending party encrypts the data using the symmetric key algorithm and the symmetric key. Once the data is encrypted, it is transmitted to the receiving party over a transmission medium (e.g., the Internet, a telephone line, a local area network, a wide area network, an Ethernet link, etc.). Upon receipt, the receiving party decrypts the data using the same symmetric key, which must be transmitted to it or derived by it by some appropriate security mechanism.

Encrypting data using public key algorithms is somewhat more expensive than using a symmetric key algorithm, but it is fairly easy to get secured keys (e.g., a public key and a private key) to both parties. Thus, to obtain the cost saving benefits of symmetric key encryption and the key distribution advantage of public/private key pairs, a wrap session key is provided to the receiving party along with the encrypted data. The wrap session key is an encrypted version of the symmetric key, where the symmetric key has been encrypted using the public key (of a public/private key pair) of the receiving party. When the receiving party receives the encrypted message, it decrypts the wrapped session key, using its private key, to recapture the symmetric key. Having recaptured the symmetric key, it utilizes it to encrypt the message. Typically, symmetric keys are used for relatively short duration (e.g., a communication, a set number of communications, an hour, a day, a few days), while encryption public keys are used for a longer duration (e.g., a week, a month, a year, or more).

To further enhance security of encrypted data transmissions in the secured communications system, the sending party provides its signature with encrypted messages that it transmits. The signature of the sending party consists of a tag computed as a function of both the data being signed and the signature private key of the sender. The receiving party, using the corresponding signature verification public key of the sending party, validates the signature. To ensure that the receiving party is using an authentic signature verification public key of the sending party, it obtains the signature public key certificate from a directory or a certification authority. The signature public key certificate includes the public key of the sending party and a signature of a certification authority. The receiving party, using a trusted public key of the certification authority, verifies the signature of the certification authority. Once the signature of the certification authority is verified, the receiving party can trust any message that was signed by the certification authority. Thus, the signature public key certificate is verified, which, in turn, allows the receiving party to trust the signature public key of the sending party to verify its signature.

To ensure that the signature verification public key certificates and the encryption public key certificates are reliable, some systems employ a key and life cycle management process. The key and life cycle management process updates public keys (both encryption and verification) as well as certificates containing such information. The updating may result from certificate revocation, key recovery, authority revocation, certificate expiration, and/or system policy changes. To take advantage of the key and certificate life-style management, software applications must embed key and certificate life-style management programming instructions. In most software applications, however, the key and certificate life-cycle management software is not included because software developers lack familiarity with security related functions. Thus, when a certificate and/or public key has expired, most software applications will not track the changes, thus compromising the security of data produced by the software application.

Therefore, a need exists for a method and apparatus that centralizes processing of key and certificate life-cycle management without the software applications having to include the corresponding programming instructions.

DETAILED DESCRIPTION OF A PREFERRED EMBODIMENT

Generally, the present invention provides a method and apparatus for centralizing the processing of key and certificate life-cycle management. This is accomplished when security activation of a communication device has been detected. Security activation may occur at log-on of the secure communication device (e.g., a personal computer equipped with a security application, or applications), at activation of a security application, or at re-authentication of a security application. Once the security activation has been detected, the secured communication device accesses a depository of security information to retrieve relevant security information. The secured communication device then interprets the relevant security information to determine when local security parameters are to be changed. When local security parameters (e.g., encryption key pair, a corresponding encryption public key certificate, a signing key pair, and/or a corresponding verification public key certificate) are to be changed, the local security parameters are updated. Having done this, the secured communication device is then receptive to receiving access requests from a plurality of software applications. The access requests are each requesting that data created by a corresponding one of the plurality of software application be secured via the security application. In response to the request, the data is secured based on either the updated local security parameters or the existing local security parameters. With such a method and apparatus, key and certificate life cycle management is centralized within a secure communication device such that software applications do not need to include such functionality. Further, by centralizing the process, the processing of key and life-cycle management is available for software applications that do not include such functionality.

Figure 1:
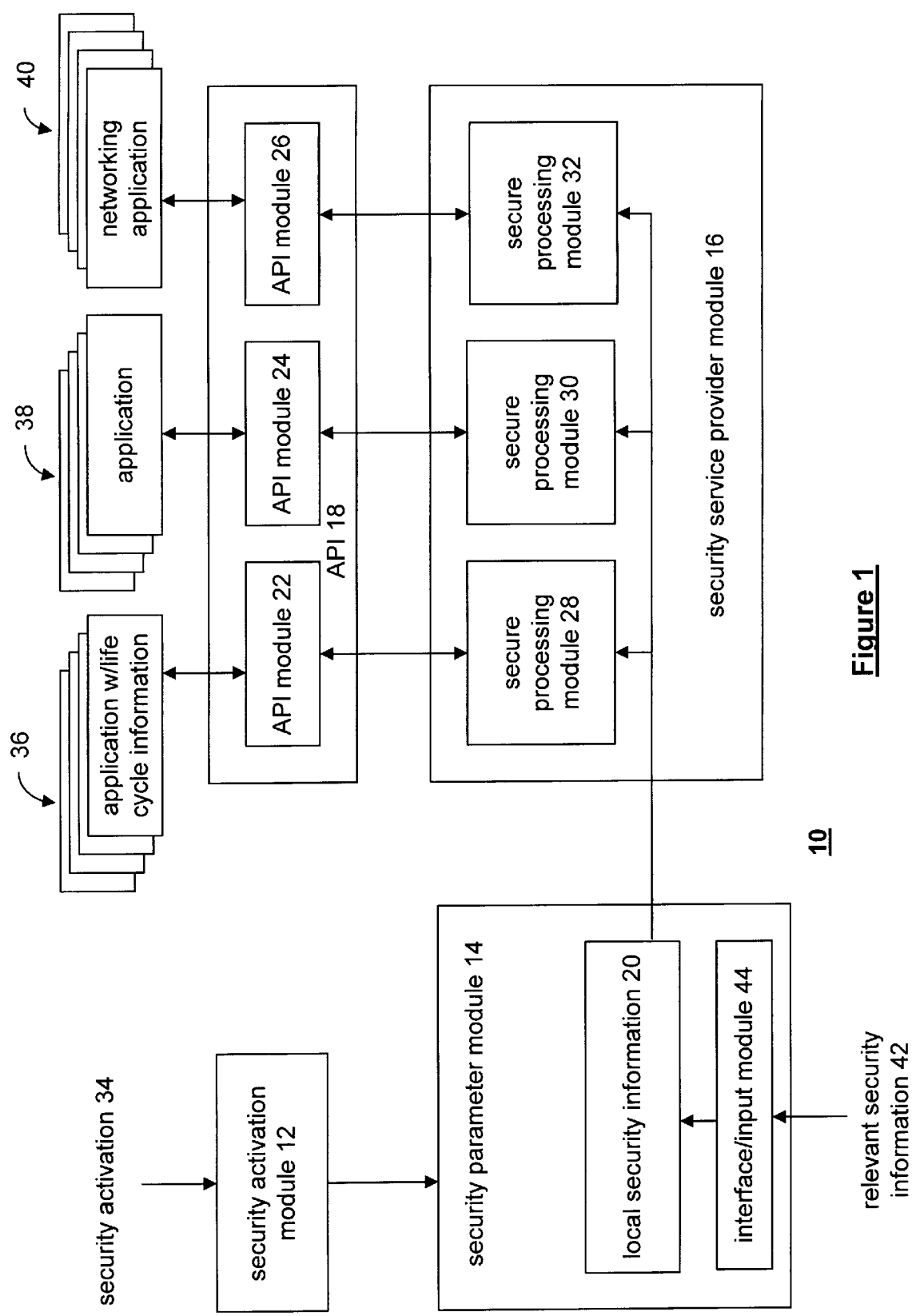
FIG. 1 illustrates a schematic block diagram of a secured communication device in accordance with the present invention.
Figure 2:
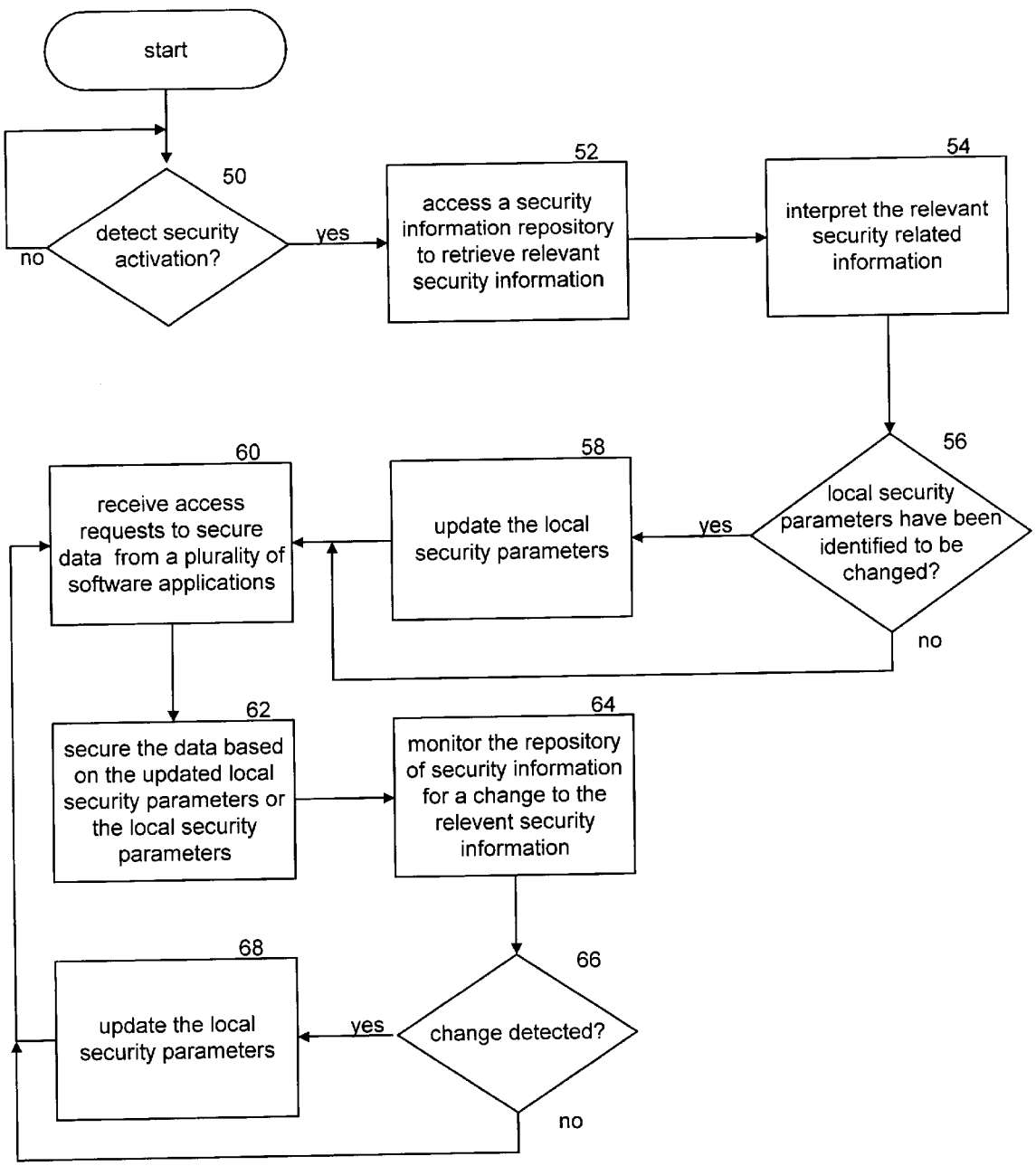
FIG. 2 illustrates a logic diagram of a method for processing key and certificate and life-cycle management in accordance with the present invention.
Figure 3:
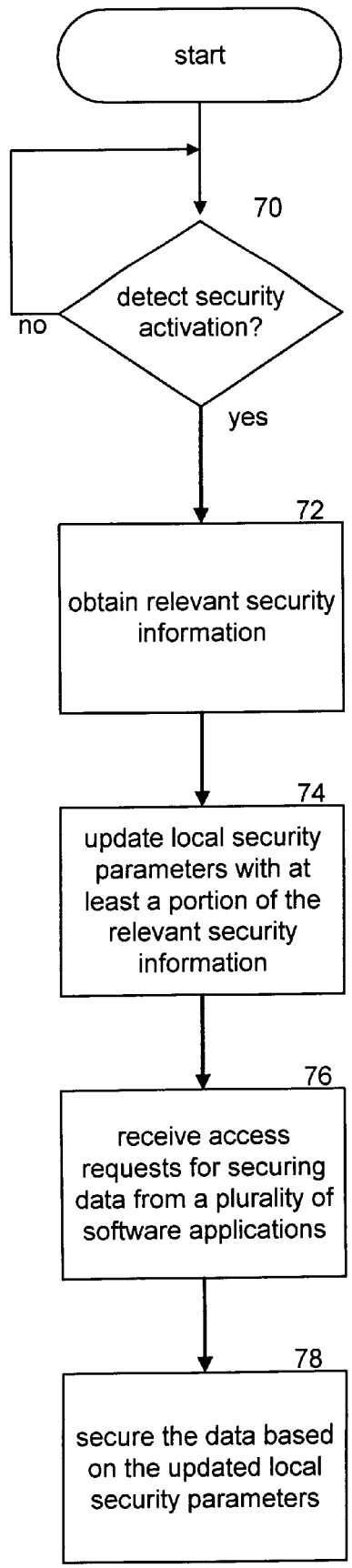
FIG. 3 illustrates a logic diagram of an alternate method for processing key and certificate life cycle management in accordance with the present invention.

The present invention can be more fully described to FIGS. 1 through 3. FIG. 1 illustrates a schematic block diagram of a secure communication device 10 or computing device. The secure communication device 10 may be a computer, laptop computer, personal digital assistant, or any other device that processes digital data based on programming instructions. The secure communication device 10 includes a security activation module 12, a security parameter module 14, a security service provider module 16, and an application programmatic interface 18 ("API"). Each of these modules may be fabricated as hardware modules to perform the subsequently described functions, may be incorporated in software that would be executed by a processing unit, and/or a combination thereof.

The security activation module 12 detects security activation 34 of the secure computing device 10. Such activation may be at the log on at the secure communication device, when the secure communication device logs on to a security application (i.e., at activation of the security application), or when the security applications is re-authenticated. As such, the detection of security activation 34 is done rather infrequently in comparison to the times that software applications are accessed by the secure communication device and even more infrequently in comparison to the times that data created by the applications is secured.

Having detected security activation 34, the security activation module 12 provides a signal to the security parameter module 14, which obtains relevant security information 42. The retrieval of the relevant security information 42 may be done by accessing a directory, a server/manager, and/or by accessing internal memory of the computing device. The relevant security information 42 is received via an interface module and/or an input module 44. The relevant security information 42 may include a complete list of the security information, an indication of the security information that has changed, and/or the changed security information. Typically, the module 44 will be an interface if accessing the relevant security information 42 from a directory. The module 44 will be an input module if the data is retrieved locally, wherein the user of the computing device selects the relevant portions of the security information. Recall that the security information includes an encryption key pair, a corresponding encryption public key certificate, a signing key pair, and/or a corresponding verification public key certificate.

Having obtained the relevant security information 42, the security parameter module 14 determines whether the local security information is to be updated by reviewing the relevant security information 42 in comparison with the locally stored security information. When the relevant security information 42 indicates that the local security information is to be updated, the security parameter module 14 updates the local security information 20, which is stored in memory such as cache, RAM, ROM, EEPROM, magnetic tape, floppy disk, hard drive, CD ROM, DVD ROM, or any other device that stores digital information. Once the local security information has been updated (i.e., the local security information has been overwritten with the new information, a portion of the local security information has been overwritten, a portion of the local security information has been modified, or no changes were made), the secured communication device 10 is ready to process data generated by the plurality of software applications.

As shown, the application programmatic interface ("API") 18, includes an API module 22, an API module 24, and an API module 26. Each of these API modules 22–26 is coupled to a corresponding plurality of software applications. In particular, API module 22 is coupled to a plurality of applications 36; API module 24 is coupled to the plurality of applications 38; and API 26 is coupled to the plurality of applications 40. Each application in the plurality of applications 36 includes programming instructions that perform key and certificate life cycle management. As such, the API module 22 directs requests from any of these applications 36 to secure processing module 28. The secure processing module 28 secures the data provided by one of the applications 36, but does not perform the key and certificate life cycle management. Typically, the same company will manufacture applications 36 and the secure processing module 28. For example, the applications 36 may be Entrust Ready Applications while the secure processing module 28 would be reflected of Entrust Tool Kits and Entrust Cryptographic Service Processor, which are manufactured and distributed by Entrust Technologies, Ltd.

Applications 38 do not include any key and certificate life-cycle management programming instructions. As such API module 24, which may be a Microsoft Crypto API™ provides secure data requests from applications 38 to secure processing module 30. The secure processing module 30 secures data generated by the applications 38 and provides key and certificate life cycle management based on the local security information 20. Such securing may be done by performing an encryption process on the data, such as the securing process contained in Entrust/Client software, which is manufactured and distributed by Entrust Technologies, Ltd.

The third set of applications 40 is networking applications that interface with API module 26. API module 26 may be a PKCSII API, which interfaces with networking applications such as Netscape™. API module 26 provides data access requests for securing data from the applications in set 40 to secure processing module 32. The secure processing module 32 secures the data based on a security application and utilizes the local security information 20 to provide key and certificate life cycle management. Note that secure processing module 30 and secure processing module 32 are very similar to the secure processing module 28 except that modules 30 and 32 rely on the security parameter module 14 to provide the key and certificate life cycle management. Further note that each of the modules 28, 30, 32 include a security application such as Entrust/Client. The processing of the key and life cycle management can be further described with reference to FIGS. 2 and 3.

FIG. 2 illustrates a logic diagram of a method for processing key and certificate life-cycle management. The programming instructions that perform the processing steps may be stored in a digital storage medium such as cache memory, RAM, ROM, EEPROM, magnetic tape, floppy disk, hard drive, CD ROM, DVD ROM, or any other device that stores digital information. The process begins at step 50 where a determination is made as to whether security activation has been detected. As previously mentioned security activation may be detected at log-on of the secure computing device, at log-on of a security application, and/or at the re-authentication of the security application. If the security activation has been detected, the process proceeds to step 52. At step 52 the secure computing device accesses a security information repository to retrieve relevant security information. The secure information repository may be within the secure computing device, a managerial entity, such as a server that includes Entrust/Management Software, a certification authority, an administrative entity, and/or a directory.

The process then proceeds to step 54 where the relevant security related information is interpreted. Interpreting the relevant security information is done to identify whether at least one of an encryption key pair, a corresponding encryption public key certificate, a signing key pair, and a corresponding verification public/key certificate have been changed. Changes in the relevant security information may result from key recovery, expiration of the encryption key pair, expiration of the signing key pair, expiration of the encryption public key certificate, and/or expiration of the corresponding verification public key certificate. The changes may further be indicative of revocation of the encryption key pair or the signing key pair. The changes may further be indicative of a reissue of the encryption public key certificate, the verification public key certificate, and/or creation of a new encryption key pair or new signing key pair. The computing device may further interpret the relevant security related information to insure compliance with a security policy of the computing device's system, authorized administrative functionality, and/or signature verification. Signature verification is done to insure that a trusted certification authority signed the relevant security related information, where the signature is verified based on verification public key of the certification authority.

The process then proceeds to step 56 where a determination is made as to whether the local security parameters are to be changed. If so, the process proceeds to step 58 where the local security parameters are updated. Once the parameters are updated, or were determined not to be updated at step 56, the process proceeds to step 60. At step 60 access requests to secure data from a plurality of software applications are received. As discussed with reference to FIG. 1, the secure computing device may include a plurality of software applications, such as a word processing application, a drawing application, an e-mail application, and an Internet access application, etc.

Once a request is received, the process proceeds to step 62 where the data is secured based on the updated local security parameters or the local security parameters. A first secure processing module, or first process, secures the data when the request was generated by an application in a first set of the plurality of software applications. If the request was generated by an application in a second set of the applications, a second secure processing module, or second process, secures the data. The first and second processing modules may have varying access to the local secured parameters. For example, the secure processing modules may have read-only access, read/write access, no access, or managerial responsibilities for the local security parameters. The managerial responsibilities include, but are not limited to, maintaining the authenticity of the local secure parameters.

The process then proceeds to step 64 where the secure communication device monitors the depository of secure information for changes to the relevant security information. The process then proceeds to step 66 where a determination is made as to whether a change has occurred to the relevant security information. If not, the process reverts to step 60. If, however, a change has been detected, the process proceeds to step 68. At step 68, the local security parameters are updated. Once the parameters are updated, the process proceeds to step 60. Note that the computing device continues to monitor for a security activation while in the loop of steps 60–68 and, if detected, continues the process at step 52.

FIG. 3 illustrates a logic diagram of an alternate method for processing key and certificate life-cycle management. The programming instructions that perform the processing steps may be stored in a digital storage medium such as cache memory, RAM, ROM, EEPROM, magnetic tape, floppy disk, hard drive, CD ROM, DVD ROM, or any other device that stores digital information. The process begins at step 70 where a determination is made as to whether security activation has been detected. Once security activation has been detected, the process proceeds to step 72 where relevant security information is obtained. Having done this, the process proceeds to step 74 where the local security information is updated with at least a portion of the relevant security information. The local security information may be updated by being completely overwritten by the relevant security information, being partially overwritten by the relevant security information, and/or modified based on the relevant security information.

The process then proceeds to step 76 where access requests for securing data from a plurality of software applications is received. The process then proceeds to step 78 where the data is secured and key and certificate life cycle management is performed based on the updated local security parameters. By performing the key and certificate life cycle management, the data is secured using trustworthy security parameters.

The preceding discussion has presented a method and apparatus for processing key and certificate life cycle management. Such a process is done in a centralized manner such that applications do not need to include such functionality, which most applications do not normally include. Such applications can now confidently secure data with trustworthy security parameters that are verified by the key and life-cycle management process disclosed herein.

What is claimed is:

1. A method for centralized processing of key and certificate life cycle management, the method comprises the steps of:

a) detecting security activation;

b) when the security activation is detected, accessing a repository of security information to retrieve relevant security information;

c) interpreting the relevant security information to determine when local security parameters have been identified to be changed;

d) when the local security parameters have been identified to be changed, updating the local security parameters to produce updated local security parameters;

e) receiving access requests from a plurality of software applications, wherein the access requests are each requesting that data created via a corresponding one of the plurality of software applications be secured; and f) securing the data based on one of the local security parameters and the updated local security parameters.

2. The method of claim 1 further comprises, within step (f), securing, by a first process, data generated by software applications in a first set of the plurality of software applications, wherein the first set of the plurality of applications interfaces with the first process via a first application programmatic interface; and securing, by a second process, data generated by software applications in a second set of the plurality of software applications, wherein the second set of the plurality of software applications interfaces with the second process via a second application programmatic interface, wherein the first and second security processes utilize the local security parameters or the updated local security parameters to secure the data.

3. The method of claim 2 further comprises:
securing, by the first process, the data generated by the software applications in the first set based on a first cryptographic service;
securing, by the second process, the data generated by the software applications in the second set based on a second cryptographic service, wherein the first and second processes obtain the local security parameters on a read-only basis.

4. The method of claim 3 further comprises:
monitoring the repository of security information for a change to the relevant security information;
when the change is detected, retrieving at least a changed portion of the relevant security information;
updating the local security parameters with the at a changed portion of the relevant security information.

5. The method of claim 4 further comprises requesting, by the first process, notification of the updating of the local security parameters.

6. The method of claim 1 further comprises, within step c), interpreting at least one of an encryption key pair, a corresponding encryption public key certificate, a signing key pair, and a corresponding verification public key certificate as the local security parameters.

7. The method of claim 6 further comprises identifying the change to be at least one of:
 i) key recovery of the encryption key pair,
 ii) expiration of the encryption key pair, the signing key pair, the encryption public key certificate, or the corresponding verification public key certificate;
 iii) revocation of the encryption key pair or the signing key pair;
 iv) re-issue of the encryption public key certificate or the verification public key certificate; and
 v) creation of the encryption key pair or the signing key pair.

8. The method of claim 1 further comprises, within step c), interpreting at least one of verification public key certificate of a certification authority, administrative function, and security policy information as the local security parameters.

9. The method of claim 1 further comprises, within step (a), detecting the security activation as at least one of: log-on of a computing device, log-on to a security application, and re-authentication of the security application.

10. The method of claim 9 further comprises, within step (b), accessing at least one of: the computing device, a managerial entity, a certification authority, an administrative entity, and directory as the repository of security information.

11. A method for centralized processing of key and certificate life cycle management, the method comprises the steps of:
 a) detecting security activation;
 b) when the security activation is detected, obtaining relevant security information;
 c) updating local security parameters with at least a portion of the relevant security information to produce updated local security parameters;
 d) receiving access requests from a plurality of software applications, wherein the access requests are each requesting that data created via a corresponding one of the plurality of software applications be secured; and
 e) securing the data based on the updated local security parameters.

12. The method of claim 11 further comprises, within step (b), obtain the relevant security information by at least one of retrieval from a repository, creating the relevant security information, and determining the relevant security information from a plurality of security parameters based on received security selection inputs.

13. The method of claim 11 further comprises, within step (e),
securing, by a first process, data generated by software applications in a first set of the plurality of software applications, wherein the first set of the plurality of applications interfaces with the first process via a first application programmatic interface; and
securing, by a second process, data generated by software applications in a second set of the plurality of software applications, wherein the second set of the plurality of software applications interfaces with the second process via a second application programmatic interface, wherein the first and second security processes utilize the local security parameters or the updated local security parameters to secure the data.

14. The method of claim 11 further comprises, within step (a), detecting the security activation as at least one of log-on of a computing device, log-on to a security application, and re-authentication of the security application.

15. A secure communication device that includes key and certificate life cycle management, the secure communication device comprises:
security activation module operably coupled to detect security activation of the secure communication device;
security parameter module operably coupled to the security activation module, wherein the security parameter module obtains relevant security information of the secure communication device when the security activation is detected, and wherein the security parameters module updates local security information based on the relevant security information;
security service provider module operably coupled to the security parameter module; and
application programmatic interface operably coupled to the security service provider module and a plurality of software applications, wherein, when one of the plurality of software applications has data to be secured, the application programmatic interface operably couples the one of the plurality of software applications with the security service provider module, and wherein the security service provider module secures the data based on the local security parameters.

16. The secure communication device of claim 15 further comprises:
the application programmatic interface including a first application programmatic interface and a second application programmatic interface;
the security service provider module including a first secure processing module and a second secure processing module, wherein the first application programmatic interface operably couples a first set of the plurality of software applications to the first secure processing module and the second application programmatic interface operably couples a second set of the plurality of software applications to the second secure processing module, and wherein the first and second processing modules utilize the local security parameters to secure data of the first and second sets of the plurality of software applications, respectively.

17. The secure communication device of claim 15 further comprises the local security information including at least one of: an encryption key pair, a corresponding encryption public key certificate, a signing key pair, and a corresponding verification public key certificate.

18. The secure communication device of claim 17 further comprises the security parameter module updating the local security information based on at least one of i) key recovery of the encryption key pair, ii) expiration of the encryption key pair, the signing key pair, the encryption public key certificate, or the corresponding verification public key certificate;

iii) revocation of the encryption key pair or the signing key pair;

iv) re-issue of the encryption public key certificate or the verification public key certificate; and v) creation of the encryption key pair or the signing key pair.

19. The secure communication device of claim 15 further comprises, within the security parameter module, an interface that interfaces with a repository of security information.

20. The secure communication device of claim 15 further comprises, within the security parameter module, an input module that receives input commands that select the relevant secure information from a plurality of security parameters.

21. A digital storage medium for storing programming instructions that, when read by a processing unit, causes the processing unit to centralize processing of key and certificate life cycle management, the digital storage medium comprises:

first storage means for storing programming instructions that, when read by the processing unit, causes the processing unit to detect security activation;

second storage means for storing programming instructions that, when read by the processing unit, causes the processing unit to access a repository of security information to retrieve relevant security information when the security activation is detected;

third storage means for storing programming instructions that, when read by the processing unit, causes the processing unit to interpret the relevant security information to determine when local security parameters have been identified to be changed;

fourth storage means for storing programming instructions that, when read by the processing unit, causes the processing unit to update the local security parameters to produce updated local security parameters when the local security parameters have been identified to be changed;

fifth storage means for storing programming instructions that, when read by the processing unit, causes the processing unit to receive access requests from a plurality of software applications, wherein the access requests are each requesting that data created via a corresponding one of the plurality of software applications be secured; and sixth storage means for storing programming instructions that, when read by the processing unit, causes the processing unit to secure the data based on one of: the local security parameters and the updated local security parameters.

22. The digital storage medium of claim 21 further comprises means for storing programming instructions that, when read by the processing unit, causes the processing unit to:

secure, by a first process, data generated by software applications in a first set of the plurality of software applications, wherein the first set of the plurality of applications interfaces with the first process via a first application programmatic interface; and secure, by a second process, data generated by software applications in a second set of the plurality of software applications, wherein the second set of the plurality of software applications interfaces with the second process via a second application programmatic interface, wherein the first and second security processes utilize the local security parameters or the updated local security parameters to secure the data.

23. The digital storage medium of claim 21 further comprises means for storing programming instructions that, when read by the processing unit, causes the processing unit to:

monitor the repository of security information for a change to the relevant security information;

retrieve at least a changed portion of the relevant security information when the change is detected, and update the local security parameters with the at a changed portion of the relevant security information.

24. A digital storage medium for storing programming instructions that, when read by a processing unit, causes the processing unit to centralize processing of key and certificate life cycle management, the digital storage medium comprises:

first storage means for storing programming instructions that, when read by the processing unit, causes the processing unit to detecting security activation;

second storage means for storing programming instructions that, when read by the processing unit, causes the processing unit to obtain relevant security information when the security activation is detected;

third storage means for storing programming instructions that, when read by the processing unit, causes the processing unit to update local security parameters with at least a portion of the relevant security information to produce updated local security parameters;

fourth storage means for storing programming instructions that, when read by the processing unit, causes the processing unit to receive access requests from a plurality of software applications, wherein the access requests are each requesting that data created via a corresponding one of the plurality of software applications be secured; and fifth storage means for storing programming instructions that, when read by the processing unit, causes the processing unit to secure the data based on the updated local security parameters.

25. The digital storage medium of claim 24 further comprises means for storing programming instructions that, when read by the processing unit, causes the processing unit to obtain the relevant security information by at least one of: retrieval from a repository, creating the relevant security information, and determining the relevant security information from a plurality of security parameters based on received security selection inputs.

26. The digital storage medium of claim 21 further comprises means for storing programming instructions that, when read by the processing unit, causes the processing unit to:

secure, by a first process, data generated by software applications in a first set of the plurality of software applications, wherein the first set of the plurality of applications interfaces with the first process via a first application programmatic interface; and secure, by a second process, data generated by software applications in a second set of the plurality of software applications, wherein the second set of the plurality of software applications interfaces with the second process via a second application programmatic interface, wherein the first and second security processes utilize the local security parameters or the updated local security parameters to secure the data.

\* \* \* \* \*